United States Patent Office 3,021,311
Patented Feb. 13, 1962

3,021,311
POLYMERIZATION OF CYCLIC ESTERS
Eugene F. Cox and Fritz Hostettler, Charleston, W. Va., assignors to Union Carbide Corporation, a corporation of New York
No Drawing. Filed Dec. 3, 1959, Ser. No. 856,907
22 Claims. (Cl. 260—78.3)

This invention relates to a process for polymerizing cyclic esters and to the products resulting therefrom.

The most generally familiar works on the polymerization of lactones are the now classical investigations of W. H. Carothers.[1] For instance, Carothers was able to polymerize delta-valerolactone to poly-delta-valerolactone by heating at 80°–85° C. for a period of about 13 days, or by contacting delta-valerolactone with potassium carbonate catalyst at a temperature of 80°–85° C. for a period of about 5 days. The resulting polymers were soft waxes possessing average molecular weights of approximately 2000 which had relatively low thermal stabilities. The literature reports that atempts to polymerize gamma-butyrolactone have been unsuccessful, and the corresponding polyester is not known. In 1934, there was reported [2] the preparation of polyepsilon-caprolactone by heating epsilon-caprolactone at about 150° C. for a period of 12 hours, or by contacting epsilon-caprolactone with potassium carbonate at about 150° C. for a period of 5 hours. The resulting epsilon-caprolactone polymers had melting points of about 53°–55° C. and average molecular weights of about 4000. The polymers were hard, brittle waxes which could not be cold-drawn into fibers. Bischoff and Waldon [3] described the transformation of glycolide under the influence of heat or a trace of zinc chloride into a polymeric solid melting at 220° C. On being distilled in a vacuum it was reconverted to the monomer melting at 86°–87° C. The literature also reports the polymerization of lactide at elevated temperatures to a resinous mass. A similar effect is also obtained at relatively lower temperatures by employing potassium carbonate as the catalyst.

In a broad aspect the present invention is directed to the process for polymerizing monomeric cyclic esters in contact with certain amide-containing catalysts to produce useful polyester products, both the cyclic ester reagents and the amide-containing catalysts being described hereinafter in a more appropriate section. The average molecular weights of the resulting polymers can range from, for example, about 900 to about 100,000, and higher. The relatively high molecular weight homopolymers and various copolymers and terpolymers prepared by the practice of the instant invention are highly useful products as will become apparent at a later section herein. In addition, the polymerization reaction can be conducted at lower temperatures and at faster polymerization rates heretofore unattainable in lactone polymerization art.

Accordingly, one or more of the following objects will be achieved by the practice of this invention.

It is an object of this invention to provide a novel process for homopolymerizing monomeric cyclic esters to produce useful homopolymers. It is another object of this invention to provide a novel process for polymerizing an admixture containing at least two different monomeric cyclic esters to produce useful polymers. A further object of this invention is to prepare lactone polymers having a high degree of utility and application in the cosmetic, wax, polish, thickening, molding, coating, fiber, film, etc., fields. Other objects will become apparent to those skilled in the art in the light of the instant specification.

In one embodiment the monomeric cyclic esters employed in the polymerization process of this invention can be characterized by the following formula:

I

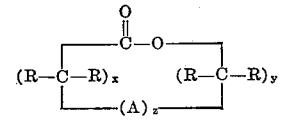

wherein each R, individually, can be hydrogen, alkyl, aryl, alkaryl, aralkyl, cycloalkyl, halo, haloalkyl, alkoxyalkyl, alkoxy, aryloxy, and the like; wherein A can be an oxy (—O—) group, a thio (—S—) group, a divalent saturated aliphatic hydrocarbon group, and the like; wherein $x$ is an integer from 1 to 15 inclusive; wherein $y$ is an integer from 1 to 15 inclusive; wherein $z$ is an integer having a value of zero or one; with the provisos that (a) the sum of $x+y+z$ cannot equal 3, (b) the total number of atoms forming the cyclic ester ring does not exceed 18, preferably does not exceed 9, (c) the total number of organic substituents (such as those described for the R variables) attached to the carbon atoms contained in the cyclic ester ring does not exceed 4, preferably does not exceed 3, (d) from 2 to 4 continuously linked carbon atoms contained in the cyclic ester ring can represent a portion of a saturated cycloaliphatic hydrocarbon nucleus which contains from 4 to 10 ring carbon atoms, and (e) the four R variable attached to any two adjacent carbon atoms contained in the cyclic ester ring can represent a portion of a fused aromatic hydrocarbon nucleus.

With reference to Formula I supra, illustrative R radicals include, among others, methyl, ethyl, n-propyl, isopropyl, n-butyl, sec-butyl, t-butyl, amyl, the hexyls, the heptyls, the octyls, dodecyl, octadecyl, phenyl, benzyl, tolyl, xylyl, ethylphenyl, butylphenyl, phenethyl, phenylpropyl, phenylbutyl, cyclopentyl, 2-propylcyclohexyl, cyclohexyl, 2-methylcyclohexyl, cycloheptyl, chloromethyl, chloroethyl, bromopropyl, bromobutyl, chloro, fluoro, bromo, iodo, methoxymethyl, ethoxyethyl, propoxymethyl, butoxypropyl, methoxy, ethoxy, n-propoxy, n-butoxy, isopentoxy, n-hexoxy, 2-ethylhexoxy, 3-methyloctoxy, decoxy, dodecoxy, octadecoxy, phenoxy, ethylphenoxy, propylphenoxy, dimethylphenoxy, phenylpropoxy, and the like. It is preferred that each R, individually, be hydrogen, alkyl, and/or alkoxy, and preferably still, that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the substituents attached to the cyclic ester ring does not exceed twelve. Cycloalkyl and lower alkyl-substituted cycloalkyl radicals which have from 5 to 7 carbon atoms in the cycloaliphatic nucleus also are preferred.

In the discussion of the generic class of monomeric cyclic esters (Formula I) contemplated in the process of the invention, five provisos enumerated from (a) through (e) have been set forth. Proviso (a) states that the sum of $x+y+z$ cannot be a number equal to three. This proviso excludes cyclic ester compounds which contain five atoms in the ring such as, for example,

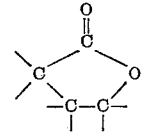

a gamma-butyrolactone

[1] Collected Papers of Wallace H. Carothers, edited by H. Mark and G. S. Whitby, volume I, Interscience Publishers, Inc., New York (1940).
[2] F. J. van Natta, J. W. Hill and W. H. Carothers, Jour. Amer. Chem. Soc., 56. 455 (1934).
[3] Ber., 36, 1200 (1903).

Prior art [4] attempts to polymerize gamma-butyrolactone and the substituted gamma-butyrolactones have been unsuccessful. Attempts to polymerize the cyclic esters, e.g., gamma-butyrolactones, beta-oxa-gamma-butyrolactones, and the like, in the process of this invention likewise have failed. One would postulate that the thermodynamic stability of these monomeric cyclic esters which contain five atoms in the lactone ring is much greater than the corresponding polymers, and that the free energy of interconversion is exceedingly low. Proviso (c) states that the total number of organic substituents attached to the carbon atoms contained in the cyclic ester ring should not exceed four, and preferably should not exceed three. It has been observed that when the total number of organic substituents on the cyclic ester ring approached four or more, then the polymerizability of the cyclic ester monomer in the process of the invention diminished drastically. Proviso (d) states that from 2 to 4 continuously linked carbon atoms contained in the cyclic ester ring can represent a portion of a saturated cycloaliphatic hydrocarbon nucleus which contains from 4 to 10 ring carbon atoms such as, for example, a saturated cycloaliphatic hydrocarbon nucleus derived from cycloalkane, alkyl-substituted cycloalkane, cyclobutane, cyclopentane, cyclohexane, cycloheptane, cyclooctane, methylcyclopentane, methylcyclohexane, and the like. Thus, for example, the following illustrative cyclic esters would be included in this proviso:

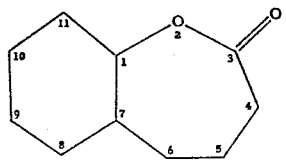

2-oxabicyclo[5.4.0]undecan-3-one (cis or trans)

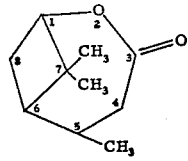

2-oxa-5,7,7-trimethylbicyclo[4.1.1]octan-3-one

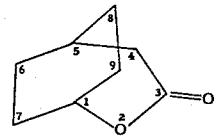

2-oxabicyclo[3.2.2]nonan-3-one

Proviso (e) states that the four R variables attached to any two adjacent carbon atoms contained in the cyclic ester ring can represent a portion of a fused aromatic hydrocarbon nucleus, that is, an aromatic nucleus derived from benzene, alkylbenzene, methylbenzene, propylbenzene, naphthalene, and the like. To illustrate this proviso, the following compound is depicted structurally.

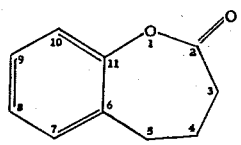

2,3,4,5-tetrahydro-2-keto-benzoxepin

In the structurally depicted compound immediately above, the four R variables which were attached to the carbon atoms designated by numerals 6 and 11 now represent a portion of the fused benzene ring, namely the carbon atoms designated by the numerals 7, 8, 9, and 10. The following compound further illustrates proviso (e).

[4] W. H. Carothers, G. L. Dorough, and F. J. van Natta, Jour. Am. Chem. Soc., 54, 761 (1932).

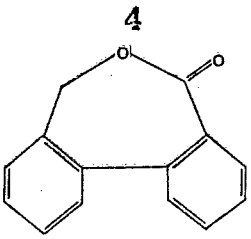

2-(2'-hydroxymethylphenyl)benzene carboxylic acid lactone

Representative monomeric cyclic esters which can be employed as starting materials in the method of the invention include, for example, beta-propiolactone, delta-valerolactone, epsilon-caprolactone, 7-hydroxyheptanoic acid lactone, 8-hydroxyoctanoic acid lactone, 12-hydroxydodecanoic acid lactone, 13-hydroxytridecanoic acid lactone, 14-hydroxytetradecanoic acid lactone, 15-hydroxypentadecanoic acid lactone, 16-hydroxyhexadecanoic acid lactone, 17-hydroxyheptadecanoic acid lactone; the alpha, alpha-dialkyl-beta-propiolactones, e.g., alpha, alpha-dimethyl-beta-propiolactone, alpha, alpha-diethyl-beta-propiolactone, alpha, alpha-dipropyl-beta-propiolactone, and the like; the monoalkyl-delta-valerolactones, e.g., the monomethyl-, monoethyl-, monoisopropyl-, monobutyl-, monohexyl-, monodecyl-, and monododecyl-delta-valerolactones, and the like; the dialkyl-delta-valerolactones in which the two alkyl groups are substituted on the same or different carbon atoms in the cyclic ester ring, e.g., the dimethyl-, diethyl-, diisopropyl-, dipentyl-, and di-n-octyl-delta-valerolactones, and the like; the monoalkyl-, dialkyl-, or trialkyl-epsilon-caprolactones, e.g., the monomethyl-, monoethyl-, monoisopropyl-, monohexyl-, mono-n-octyl-, dimethyl-, diethyl-, di-n-propyl-, diisobutyl-, di-n-hexyl-, trimethyl-, triethyl-, and tri-n-propyl-epsilon-caprolactones, and the like; the monoalkoxy- and dialkoxy-delta-valerolactones and epsilon-caprolactones, e.g., monomethoxy-, monoethoxy-, monoisopropoxy-, monohexoxy-, dimethoxy-, diethoxy-, and dibutoxy-delta-valerolactones and epsilon-caprolactones, and the like. Further illustrative cyclic esters include 3-ethyl-2-keto-1,4-dioxane, gamma(1-isopropyl-4-methylcyclohexyl)-epsilon-caprolactone, 3-bromo-2,3,4,5-tetrahydrobenzoxepin-2-one, 2-(2'-hydroxyphenyl)benzene carboxylic acid lactone, 10-hydroxyundecanoic acid lactone, 2,5,6,7-tetrahydrobenzoxepin-2-one, 9-oxabicyclo[5.2.2]undecan-8-one, 4-oxa-14-hydroxytetradecanoic acid lactone, alpha, alpha-bis(chloromethyl)-propiolactone, 1,4-dioxane-2-one, 3-n-propyl-2-keto-1,4-dioxane, 3-(2-ethylhexyl)-2-keto-1,4-dioxane, and the like. Illustrative subclasses of cyclic esters which are eminently suitable in the process of the instant invention include the unsubstituted lactones and the oxalactones which contain from 6 to 8 atoms in the lactone ring, preferably delta-valerolactone, epsilon-caprolactone, the keto-dioxanes, and the like; the mono- and polyalkyl-substituted lactones and oxalactones which contain from 6 to 8 atoms in the lactone ring, preferably the mono- and poly-lower alkyl-delta-valerolactones, epsilon-caprolactones, and their corresponding oxalactones wherein the alkyl substituent(s) contains from 1 to 4 carbon atoms, and the like; and the mono- and poly-alkoxy-substituted lactones and oxalactones which contain from 5 to 8 atoms in the lactone ring, preferably the mono- and poly-lower alkoxy-delta-valerolactones, epsilon-caprolactones, and their corresponding oxalactones wherein the alkoxy substituent(s) contains from 1 to 4 carbon atoms.

The unsubstituted and substituted delta-valerolactones, epsilon-caprolactones, zeta-enantholactones, and higher membered lactones, e.g., mono- and polyalkyl-substituted delta-valerolactones, mono- and polyalkoxy-substituted delta-valerolactones, mono- and polycycloalkyl-substituted delta-valerolactones, aryl-substituted delta-valerolactones, mono- and polyhaloalkyl-substituted delta-valerolactones, mono- and polyalkyl-substituted epsilon-caprolactones, mono- and poly-alkoxy-epsilon-caprolactones, aryl-substituted epsilon-caprolactones, mono- and polyhaloalkyl-substituted epsilon-caprolactones, mono- and polyalkyl-substituted zeta-enantholactones, and various other lactones described previously can be prepared by reacting the corresponding cyclic ketone with an anhydrous solution comprising peracetic acid and acetone. It is desirable to add the peracetic acid solution to an excess of ketone, e.g., 5 to 1 molar ratio of ketone to peracetic acid, in a still kettle maintained under reflux. The pressure can be adjusted so as to provide a kettle temperature of, for example, about 70° C. Acetone, acetic acid by-product, and minor amounts of ketone can be continuously removed throughout the addition period. Subsequently, the lactone product can be recovered from the still kettle by conventional techniques such as by distillation.

Stoll and Rouvé[5] report the preparation of lactones which contain up to 22 carbon atoms in the lactone nucleus by a process which comprises contacting the corresponding terminal hydroxy saturated aliphatic monocarboxylic acid with benzenesulfonic acid catalyst in boiling benzene. These authors also report the preparation of other lactones such as 14-alkyl-14-hydroxytetradecanoic acid lactone, e.g., 14-hydroxypentadecanoic acid lactone, and oxa-15-hydroxypentadecanoic acid lactone, e.g., 12-oxa-15-hydroxypentadecanoic acid lactone. Palomaa and Tonkola[6] teach the preparation of 3-oxa-6-hydroxyhexanoic acid lactone by heating the corresponding terminal hydroxy saturated aliphatic monocarboxylic acid. The preparation of 2-keto-1,4-dioxane, 3-alkyl-2-keto-1,4-dioxane, polyalkoxy-substituted delta-valerolactone, mono- and polyalkyl-substituted delta-valerolactone, alkoxyalkyl-substituted delta-valerolactone, etc., is recorded by Carothers et al.[7] The preparation of dialkyl-substituted, dihalo-substituted lactone, e.g., gamma, delta-dibromo-gamma, delta-dimethyl-delta-valerolactone is reported in the literature by Levina et al.[8] German Pat. No. 562,827 discloses the preparation of 2,3,4,5-tetrahydrobenzoxepin-2-one whereas the literature[9] reports the position isomer, namely 2,5,6,7-tetrahydrobenzoxepin-2-one. Cycloalkyl-substituted epsilon-caprolactone, e.g., gamma(1-isopropyl-4-methylcyclohexyl)-epsilon-caprolactone is disclosed by Belov and Kheifits.[10] McKay et al.[11] have recorded the preparation of halo-substituted, haloalkyl-substituted delta-valerolactone. The literature also reports the preparation of various other cyclic esters.

The amide-containing compounds contemplated as catalysts in the process of the invention are (a) the divalent metal amides, (b) the divalent metal amide-alcoholates, and (c) mixtures of divalent metal amides and divalent metal amide-alcoholates, the metal portion of which has an atomic number greater than 11 and less than 57 and is found in group II of the periodic table. The divalent metals include magnesium, calcium, zinc, strontium, cadmium, and barium. The amides of magnesium and the alkaline earth metals, i.e., strontium, barium, and calcium, are preferred.

The preparation of the divalent metal amides is well-known to the art. For instance, the metal hexammoniates can be prepared by reacting the appropriate metal with liquid ammonia, the resulting product being characterized by the formula $M(NH_3)_6$ wherein M can be calcium, strontium, barium, and the like. The alkaline earth metal amides can be obtained by allowing the corresponding metal hexammoniate to decompose while protecting them from reactive gases and/or vapors such as oxygen, water, and the like. The amides of zinc, cadmium, and barium can also be prepared by the reaction between potassium amide and the bromides of the appropriate metal, the reaction being carried out in liquid ammonia. The reaction of diethylzinc or diethylmagnesium with ammonia gives the corresponding metal amides and ethane as the products.

The catalytic activity of the divalent metal amides is quickly destroyed upon exposure to air. The preparation and storage of the metal amides should be conducted under conditions in which water, oxygen, and other gases and/or vapors reactive with the metal, or the amides, are essentially excluded. Operations subsequent to the catalyst preparation should be carried out under an inert atmosphere free of gases which are reactive with the metal amides, e.g., in high purity nitrogen atmosphere.

The divalent metal amide-alcoholates which are contemplated as catalysts in the process of the invention can be characterized by the following formula:

II 

wherein M is a divalent metal which has an atomic number greater than 11 and less than 57 from group II of the periodic table, i.e., magnesium, calcium, zinc, strontium, cadmium, and barium; and wherein $R_1$ is a monovalent hydrocarbon radical, e.g., alkyl, cycloalkyl, aryl, alkaryl, aralkyl, alkenyl, cycloalkenyl, and the like. Representative $R_1$ radicals include, among others, methyl, ethyl, propyl, isopropyl, butyl, isobutyl, t-butyl, 2-ethylhexyl, 2,4,4-trimethylpentyl, decyl, dodecyl, octadecyl, cyclopentyl, cyclohexyl, 2-methylcyclopentyl, 3-amylcyclohexyl, cycloheptyl, phenyl, benzyl, tolyl, xylyl, ethylphenyl, hexylphenyl, octylphenyl, phenethyl, phenylpropyl, phenylbutyl, allyl, 3-butenyl, 3-pentenyl, cyclopentenyl, cyclohexenyl, cycloheptenyl, and the like. In a preferred aspect, the $R_1$ variable is an alkyl radical which contains from 1 to 10 carbon atoms. In a highly preferred aspect, $R_1$ is a lower alkyl, e.g., methyl, ethyl, n-propyl, butyl, and the like. It is further preferred that the divalent metal (M) be an alkaline earth metal, i.e., calcium, strontium, or barium. Of the alkaline earth metals calcium is highly preferred.

The divalent metal amide-alcoholate catalysts employed in the process of the invention can be prepared by various routes. Explanation of the catalyst preparation will be facilitated by illustrating the various chemical equations involved. In these equations the metal will be exemplified by calcium, and the organic reactant will be designated as a specific compound be it an alcohol, an epoxide, or an aldehyde. It is to be understood, however, that other divalent metals can be employed instead of calcium, and other organic reactants can be used instead of the illustrated organic reactant as will be readily apparent from a consideration of this specification.

One method of preparing the alkaline earth metal amidealcoholate catalysts is by the reaction of an epoxide compound, i.e., an epoxide compound which contains a cyclic group composed of two carbon atoms and one oxygen atom, with solid metal hexammoniate or with an ammonia solution of metal hexammoniate as shown in Equation III below.

III

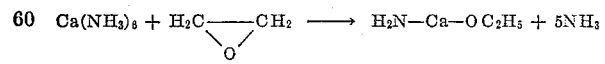

In practice, the above reaction is most conveniently carried out by dissolving the metal in liquid ammonia followed by slow addition of the epoxide compound to the resulting agitated solution. The reaction can be conducted at a temperature in the range of from about −70° C., and lower, to about +30° C., and higher. In the event an inert normally-liquid organic vehicle (described below) is employed, the lower temperature limit is above the melting point of said vehicle. It is understood, of course, that whenever liquid ammonia is employed as a reactant and/or vehicle in the chemical equations depicted in this specification, the temperaure of the liquid ammonia is below about −33.4° C. at atmospheric

---

[5] Helv. Chim. Acta, 18, 1087 (1935).
[6] Ber., 66, 1629 (1933).
[7] See footnote 1.
[8] Zhur. Obshchei Khim, 24, 1439 (1954).
[9] Ber., 68B, 1170 (1935).
[10] J. Gen. Chem. USSR, 27, 1459 (1957).
[11] J. Amer. Chem. Soc., 77, 5601-6 (1955).

pressure, or the temperature and pressure are correlated to thus essentially maintain the ammonia in the liquid state. Alternatively, ammonia can be reacted with alkaline earth metal contained in an inert normally-liquid organic vehicle such as lower dialkyl ether of alkylene glycol, for example, the dimethyl, diethyl, or dipropyl ethers of diethylene glycol, and the like; dioxane; saturated aliphatic and cycloaliphatic hydrocarbons, e.g., hexane, heptane, cyclohexane, and the like. When this procedure is followed the alkaline earth metal is added to the inert vehicle while agitating the resulting mixture. Subsequently, ammonia is slowly added to this mixture while maintaining a reaction temperature preferably below about 10° C. to assure formation of the metal hexammoniate. After this, the metal hexammoniate suspension in the inert vehicle can be reacted with the desired epoxide compound to form the metal amide-alcoholate.

With reference to Equation III supra particularly desirable epoxide reagents are those containing solely oxirane oxygen, carbon, and hydrogen, or solely oxirane oxygen, etheric oxygen, carbon, and hydrogen, said epoxide reagents containing a cyclic group composed of two carbon atoms and one oxygen atom which can be a terminal cyclic group or an internal cyclic group. Illustrative epoxides include, for example, ethylene oxide, propylene oxide, 1,2-epoxybutane, 2,3-epoxybutane, isobutylene oxide, the epoxypentanes, the epoxyhexanes, the epoxyoctanes, the epoxydecanes, 2,4,4-trimethyl-1,2-epoxypentane, 2,4,4 - trimethyl - 2,3 - epoxypentane, styrene oxide, cyclohexylepoxyethane, 1-phenyl-1,2-epoxypropane, 1,1-diphenylepoxyethane, 7-oxabicyclo[4.1.0]-heptane, 6 - oxabicyclo[3.1.0]hexane, 3 - methyl - 6-oxabicyclo[3.1.0]hexane; the 2,3-epoxyalkyl alkyl ethers, e.g., 2,3 - epoxypropyl methyl ether, 2,3 - epoxypropyl ethyl ether, 2,3-epoxypropyl propyl ether, 2,3-epoxypropyl butyl ether, 2,3-epoxypropyl 2-ethylhexyl ether, 2,3-epoxybutyl ethyl ether, 2,3-epoxypentyl butyl ether; and the like. Preferred epoxide reagents are olefin oxides, i.e., compounds containing solely carbon, hydrogen, and oxirane oxygen bonded to vicinal or adjacent carbon atoms which form a terminal or internal cyclic group. Highly preferred epoxide reagents are the lower olefin oxides, e.g., ethylene oxide, propylene oxide, butylene oxide, and the like.

According to Equation III, one mol of epoxide can react with one mol of metal hexammoniate to give the metal amide-alcoholate. It is observed, however, that very active catalysts are obtained by reacting less than one mol of epoxide with one mol of metal hexammoniate. In such preparations the unreacted metal hexammoniate in the reaction product ultimately decomposes to the corresponding metal amide. The end result is a mixture of metal amide and metal amide-alcoholate which mixture is an exceedingly active catalyst. Only small amounts, e.g., 0.1 mol, or lower, of epoxide per mol of metal hexammoniate, are required in the reaction exemplified by Equation III to give an ultimate reaction product (mixture of metal amide and metal amide-alcoholate) which exhibit high catalytic activity.

Another method of preparing the divalent metal amide-alcoholate catalysts is by the reaction of a monohydroxy organic compound with the divalent metal amide or the divalent metal hexammoniate as illustrated by Equations IV and V below.

IV    $Ca(NH_3)_6 + HOC(CH_3)_3$
      $\rightarrow H_2N-Ca-OC(CH_3)_3 + H_2 + 5NH_3$

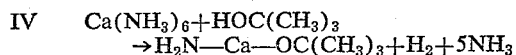

V    $Ca(NH_2)_2 + HOC(CH_3)_3$
      $\rightarrow H_2N-Ca-OC(CH_3)_3 + NH_3$

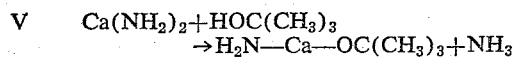

Equation IV is applicable to alkaline earth metal hexammoniate preferably dissolved in liquid ammonia whereas in Equation V the reagent can be a divalent metal amide wherein the metal portion has an atomic number greater than 11 and less than 57 from group II of the periodic table. The reactions illustrated by Equations IV and V can be conducted at a temperature in the range of from about −70° C., and lower, to about +60° C., and higher. Of course, when an inert normally-liquid vehicle is employed, the lower temperature limit is above the melting point of said vehicle. In general, the monohydroxy organic compound can be a saturated aliphatic alcohol, a saturated cycloaliphatic alcohol, or a phenol (including fused aromatic nuclei containing a hydroxyl radical). The hydroxyl group can be attached to a primary, secondary, tertiary, or aromatic carbon atom. Illustrative monohydroxy organic compounds include, for example, alkanols, e.g., methanol, ethanol, n-propanol, isopropanol, butanol, t-butanol, hexanol, 2-ethylhexanol, octanol, decanol, dodecanol, and the like; cycloalkanols, e.g., cyclopentanol, cyclohexanol, cycloheptanol, 2-methylcyclohexanol, and the like; phenols, e.g., phenol, xylenol, naphthaol, and the like. The saturated aliphatic hydrocarbon alcohols are preferred. The lower saturated aliphatic hydrocarbon alcohols, e.g., methanol, ethanol, isopropanol, t-butanol, and the like, are highly preferred. Tertiary butanol is most highly preferred. The reactions illustrated by Equations IV and V produce active catalysts of optimum activity when from about 0.2 mol, and lower, to about 0.7 mol, and higher, of hydroxy compound per mol of metal hexammoniate or metal amide is employed.

With reference to Equations IV and V the reaction of the monohydroxy compound with metal hexammoniate is readily carried out in a liquid ammonia medium preferably under rapid agitation. The reaction of the monohydroxy compound with metal amide can also be carried out in liquid ammonia after the evolution of hydrogen associated with the conversion of metal hexammoniate to metal amide has ceased. Again, rapid agitation is desirable. Alternatively, the reaction can be carried out by suspending the metal amide reagent in an inert normally-liquid organic vehicle, e.g., heptane, cyclohexane, and the like, and then adding the monohydroxy compound to the resulting slurry or suspension, preferably under agitation. When such a preparative method is employed, the resulting slurry or suspension can be used directly as the catalyst source for effecting the polymerization reaction.

A third method of preparing the divalent metal amide-alcoholate catalysts is by the reaction of a saturated aliphatic aldehyde with alkaline earth metal hexammoniate, preferably in a liquid ammonia medium, according to the following equation.

VI    $Ca(NH_3)_6 + H_3\overset{O}{\overset{\|}{C}}CH \longrightarrow H_2N-Ca-OC_2H_5 + 5NH_3$

The reaction can be conducted at a temperature in the range of from about −70° C., and lower, to about +60° C., and higher. When employing an inert normally-liquid vehicle, the lower temperature limit is above the melting point of said vehicle. Active catalysts of optimum activity are produced when from about 0.2 mol, and lower, to about 0.7 mol, and higher, of aldehyde per mol of metal hexammoniate are employed.

Illustrative saturated aliphatic aldehydes which can be employed in exemplary Equation VI above include, among others, formaldehyde, acetaldehyde, propionaldehyde, n-butyraldehyde, isobutyraldehyde, n-valeraldehyde, isovaleraldehyde, decanal, and the like. Lower saturated aliphatic aldehydes, e.g., acetaldehyde, propionaldehyde, n-butyraldehyde, and the like, are preferred.

With reference to Equations III, IV, V, and VI, any excess liquid ammonia present in the reaction product is allowed to weather or evaporate from same.

When the metal amide-alcoholates are subjected to hydrolysis the products are, as expected, ammonia and alcohol. It might be noted that the alcohol produced by hydrolysis of metal amide-propylate (prepared via Equation III using propylene oxide as the epoxide) is isopropanol. Moreover, infra-red analysis of the metal amide-alcoholates discloses the presence of metal to oxygen bonds. In addition, mass spectrometer analysis of the hydrolyzed product of metal amide-ethylate (prepared via Equation III using ethylene oxide as the epoxide) discloses the presence of ethanol ion. These data disclose that the products resulting from Equations III, IV, V, and VI supra contain amide groups and alcoholate groups. In effect, the metal amide-alcoholates can be considered to be modified or promoted metal amides of optimum and desirable catalytic activity.

Though the metal amide-alcoholates are not pyrophoric their catalytic activity is readily destroyed upon exposure to air. It is oftentimes desirable and convenient to form a suspension or slurry of metal amide-alcoholate in an inert normally-liquid organic vehicle such as a saturated hydrocarbon, e.g., heptane, cyclohexane, and the like; organic ether, e.g., dioxane lower dialkyl ethers of alkylene glycol, etc. In this manner, the metal amide-alcoholate is protected from exposure to the atmosphere, and the slurry or suspension also provides a convenient method of transportation, storage, and measurement.

The catalysts contemplated in the process of the invention are employed in catalytically significant quantities. In general, a catalyst concentration in the range of from about 0.001, and lower, to about 10, and higher, weight percent, based on the weight of total monomeric feed, is suitable. A catalyst concentration in the range of from about 0.01 to about 3.0 weight percent is preferred. A catalyst concentration in the range of from about 0.05 optimum results, the particular catalyst employed, the nature of the monomeric reagent(s), the operative conditions under which the polymerization reaction is conducted, and other factors will largely determine the desired catalyst concentration.

The polymerization reaction can be conducted over a wide temperature range. Depending upon various factors such as the nature of the monomeric reagent(s) employed, the particular catalyst employed, the concentration of the catalyst, and the like, the reaction temperature can be as low as 0° C., and lower, and as high as 250° C., and higher. A suitable temperature range is from about 20° to about 200° C. A reaction temperature in the range of from about 50° to about 180° C. is preferred.

The polymerization reaction preferably occurs in the liquid phase, and to this extent sufficient pressure is employed to maintain an essentially liquid reaction mixture regardless whether or not an inert normally-liquid organic vehicle is employed. Preferably, the polymerization reaction is conducted under an inert atmosphere, e.g., nitrogen, butane, helium, etc. The ultimate molecular weight of the resulting polymer will depend, to an extent, upon various factors such as the temperature, the choice and concentration of the catalyst, the use and amount of an inert normally-liquid organic vehicle(s), and the like.

In general, the reaction time will vary depending on the operative temperature, the nature of the monomeric cyclic esters employed, the particular catalyst and the concentration employed, the use of an inert normally-liquid organic vehicle, and other factors. The reaction time can vary from several seconds to several hours, or more, depending on the variables illustrated above.

It is preferred to conduct the polymerization reaction in the essential absence of impurities which contain active hydrogen since the presence of such impurities tends to deactivate the catalyst and/or increase the induction period. The minimization or essential avoidance of impurities such as water, carbon dioxide, aldehydes, ketones, etc., is highly desirable. It is also preferred that the polymerization reaction be conducted under substantially anhydrous conditions.

When polymerizing an admixture containing at least two different cyclic esters, the proportions of said cyclic esters can vary over the entire range. Broadly the concentration of each monomeric cyclic ester is in the range of from about 3 to about 97 weight percent, based on the total weight of said cyclic esters. The preferred range is from about 15 to about 85 weight percent. Admixtures containing epsilon-caprolactone and mono- and/or polyalkyl-substituted epsilon-caprolactone (including isomeric mixtures thereof) are highly preferred as starting materials in the process of the invention. Admixtures containing different mono- and/or polyalkyl-substituted epsilon-caprolactones (including isomeric mixtures of the same and/or different mono- and/or polyalkyl-substituted epsilon-caprolactones) also are highly preferred.

The polymers of this invention can be prepared via the bulk polymerization, suspension polymerization, or the solution polymerization routes. The polymerization reaction can be carried out in the presence of an inert normally-liquid organic vehicle such as, for example, aromatic hydrocarbons, e.g., benzene, toluene, xylene, ethylbenzene, and the like; various oxygenated organic compounds such as anisole, the dimethyl and diethyl ethers of ethylene glycol, of propylene glycol, of diethylene glycol, and the like; normally-liquid saturated hydrocarbons including the open chain, cyclic, and alkyl-substituted cyclic saturated hydrocarbons such as hexane, heptane, various normally-liquid petroleum hydrocarbon fractions, cyclohexane, the alkylcyclohexane, decahydronaphthalene, and the like. If desired, a mixture of mutually miscible inert normally-liquid organic vehicles can be employed.

The process of the invention can be executed in a batch, semi-continuous, or continuous fashion. The reaction vessel can be a glass vessel, steel autoclave, elongated metallic tube, or other equipment and material employed in the polymer art. The order of addition of catalyst and monomeric reagent(s) does not appear to be critical. A suitable procedure is to add the catalyst to the reaction zone containing the monomeric reagent(s) and inert organic vehicle, if any. If desired, the catalyst can be in solution or suspension (in an inert normally-liquid organic vehicle). Incremental addition of catalyst to the reaction zone can be employed. If desired, the above procedure can be reversed, that is, the monomeric reagent(s) per se or as a solution or suspension in an inert organic vehicle can be added to the reaction zone containing the catalyst (or a catalyst solution or suspension). Also, the catalyst, reagent(s), and inert organic vehicle, if any, can be added to the reaction zone simultaneously. The reaction zone (be it a closed vessel or an elongated tube) can be fitted with an external heat exchanger to thus control undue temperature fluctuations, or to prevent any possible "runaway" reaction temperatures due to the exothermic nature of the reaction. In a continuous operation employing as the reaction zone an elongated tube or conduit, the use of one or a plurality of separate heat exchangers can be conveniently used. In a batch operation, stirring means can be provided for agitating the reaction mixture, as desired.

Unreacted monomeric reagent oftentimes can be recovered from the reaction product by conventional techniques such as by heating said reaction product under reduced pressure. Removal of unreacted monomeric reagent(s) and/or inert organic vehicle can be accomplished by mechanical means such as treatment of the reaction product in a Marshall Mill and the like. The polymer product also can be recovered from the reaction product by washing said reaction product with an inert normally-liquid organic vehicle, e.g., heptane, and subsequently drying same under reduced pressure at slightly elevated temperatures. Another route involves dissolution in a first organic vehicle, followed by the addition of a second inert organic vehicle which is miscible with the first vehicle but which is a non-solvent for the polymer product, thus precipitating the polymer product. If desired, the reaction product can be dissolved in an inert organic vehicle such as acetone, and the like, followed by the addition of sufficient water to the resulting solution, said water being miscible with said inert organic vehicle but being a non-solvent for the water-insoluble polymer thereby precipitating the polymer product. Recovery of the precipitated polymer can be effected by filtration, decantation, etc., followed by drying same as indicated previously.

The linear polyester products resulting from the process of the invention can be characterized by the following recurring structural unit:

VII 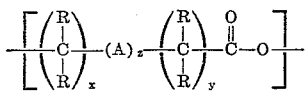

wherein the variables R, A, x, y, and z, have the same values as shown in Formula I supra. Of course, the five provisos enumerated as (a) through (e) set forth in the discussion of Formula I supra likewise apply to the structural unit designated as Formula VII above. In addition, as indicated previously, the molecular weights of the polyester products can range from about 900 to about 100,000, and higher. The ultimate molecular weight and properties of the polyester products will depend, in the main, upon the choice of the cyclic ester(s) and catalyst, the concentration of the catalyst, the operative conditions employed, e.g., temperature, etc., the purity of the monomeric reagent(s) and catalyst, the use and amount of an inert normally-liquid organic vehicle, and the like.

It is readily apparent that the linear homopolymers are essentially characterized by the same recurring unit which falls within the scope of Formula VII supra. The copolymers, terpolymers, etc., on the other hand, can contain as little as 1.0 weight percent, and lower, and upwards to 99 weight percent, and higher, of the same recurring unit. Desirable polymers are those in which the weight percent of the different recurring units is in the range of from about 3 to about 97. In the highly preferred copolymers the weight percent of the two different recurring units is in the range of from about 15 to about 85.

The polymers obtained by the process of the invention are a useful class of polyester compounds. These polymers can range from viscous liquids to extremely tough, crystalline solids. The polymers in the range of from very viscous liquids to relatively low molecular weight, wax-like solids are useful in the preparation of cosmetics, polishes, and waxes, and as thickening agents for various lubricants. The polymers can be employed to size cellulosic material or they can be used as anti-static agents in the treatment of fibrous materials. They can also be employed as protective coatings and/or impregnants. These polymers are also useful as oil additives and binders for green linoleum. The solid polymers are useful for the production of various shaped articles such as brush handles, buttons, lamp bases, toys, and the like. The crystalline polymers can be shaped into useful fibers by conventional means such as by extrusion. The solid crystalline and non-crystalline polymers also are useful in the preparation of films by such techniques as milling on a two-roll mill, calendering, solvent casting, and the like.

In passing, it should be noted that one apparent advantage afforded by the practice of the invention is the preparation of copolymers, terpolymers, etc., whose physical characteristics can be "tailor-made" to fit desired fields of applications and uses. In other words, by adjusting the concentration of the monomeric charge to a particular polymerization system, copolymers, terpolymers, etc., which cover a wide spectrum of properties and characteristics can be prepared, e.g., soft, rubbery polymers to highly crystalline polymers.

In illustrative Examples 1-10 to follow, the catalyst preparation was conducted in the essential absence of carbon dioxide, water, and oxygen. Exposure to the atmosphere was avoided during the catalyst preparation by carrying out said preparation under a nitrogen atmosphere or an ammonia atmosphere.

In illustrative operative Examples 11-30 to follow, the polymeric product oftentimes is described as possessing a certain reduced viscosity value. By this term, i.e., "reduced viscosity," is meant a value obtained by dividing the specific viscosity by the concentration of the polymer in the solution, the concentration being measured in grams of polymer per 100 milliliters of solvent at a given temperature. The specific viscosity is obtained by dividing the difference between the viscosity of the solution and the viscosity of the solvent by the viscosity of the solvent. The reduced viscosity value is an indication of the molecular weight of the polymer. Unless otherwise indicated, the reduced viscosity value was determined at 30° C.

Also, in the illustrative operative example below, the polymerization reaction was generally conducted under an inert atmosphere, e.g., nitrogen. The reaction vessel and contents, i.e., cyclic ester(s), catalyst, and inert organic vehicle, if any, were maintained, usually under agitation, in a constant temperature, e.g., 90° C., or the reaction vessel containing the cyclic ester(s) was maintained, usually under agitation, in a constant temperature and subsequently the catalyst was added thereto. Since the polymerization reaction, in general, was exothermic a rise in temperature was observed, e.g., 140° to 150° C. In several instances the period recorded was the time observed in which the rotation of the mechanical stirrer ceased due to the high viscosity of the contents in the reaction vessel. In most cases the reaction vessel was left in the constant temperature bath for an additional period of time, e.g., about 20 minutes, or longer. Unless otherwise indicated, the examination or description of the polymeric product was conducted at room temperature, i.e., about 23° C. In general, the conversion of monomer to polymer was substantially quantitative.

EXAMPLE 1

Liquid ammonia (2 liters) is added to a 3-liter glass resin flask (maintained in a Dry Ice-acetone bath, the temperature of which is below the boiling point of liquid ammonia) while avoiding exposure to the atmosphere. Ethylene oxide (10 grams) is then dissolved in the stirred liquid ammonia. Subsequently, calcium metal nodules (100 grams) are added to the ethylene oxide-ammonia solution over a 15-minute period while stirring is continued. The flask is allowed to stand overnight exposed to room temperature conditions (approximately 20°-22° C.) while the ammonia weathers off. The solid product is transferred at room temperature, in a nitrogen filled "dry box," to a one-gallon stainless steel container half filled with glass marbles. Two liters of heptane are added to said container which is then agitated in a reciprocating paint shaker for one hour thus producing a catalyst slurry or suspension in heptane. This slurry then is further diluted with heptane.

EXAMPLE 2

Calcium metal (10 grams) and 150 milliliters of diethyl ether of diethylene glycol are charged to a 500 milliliter, 3-necked flask equipped with stirrer, blow-off vent, and gas-delivery tube. The flask is immersed in an ice bath and the temperature of the resulting reaction is maintained at 0° to 5° C. The mixture is stirred vigorously and ammonia is bubbled into the flask for about 5.25 hours during which period of time a finely-divided gold suspension is formed. Subsequently, 5 grams of propylene oxide is slowly added to the resulting suspension over a period of about 5 to 10 minutes. During the addition of the propylene oxide, the suspension changed from gold in color to grayish blue. On titration, the calcium content of the suspension is found to be 0.125 gram of calcium per 5 milliliters of suspension.

In an analogous manner as above, when 4.5 grams of strontium metal are substituted for the 10 grams of calcium metal and the preceding procedure is repeated, there is obtained an active catalyst suspension.

EXAMPLE 3

To a 3-necked flask equipped with stirrer, blow-off vent, and gas-delivery tube, there is charged 10 grams of calcium metal and 150 milliliters of diethyl ether of diethylene glycol. The flask is then immersed in an ice bath and the temperature of the resulting mixture is maintained at 0° to 5° C. The suspension of calcium in diethyl ether of diethylene glycol is vigorously stirred while ammonia is bubbled through same for a period of 6 hours thus forming a calcium hexammoniate suspension. To this suspension 17.55 grams of butylene oxide (an isomeric mixture of 1,2-epoxybutane and 2,3-epoxybutane boiling between 60° and 62° C.) are added very slowly over a period of about 10 minutes. During the addition of butylene oxide the temperature of the resulting admixture rose to 23° C.; there results a grayish-blue suspension.

EXAMPLE 4

To a 500-milliliter Parr bomb, there is charged 5 grams of calcium metal, 50 grams of liquid ammonia, and 3.5 grams of isobutylene oxide. To the resulting admixture there is added 0.1 gram of nickelous oxide to promote the reaction. The bomb is maintained at a temperature of about 0° to 4° C. for 17 hours. Hydrogen and ammonia are vented off during the course of the reaction. At the end of this period of time the resulting product is slurried in heptane.

EXAMPLE 5

To a 2-liter flask equipped with magnetic stirrer, there is charged 700 milliliters of liquid ammonia and 8 grams methanol. Calcium metal (10 grams) is slowly added to the solution of methanol and ammonia while said solution is rapidly stirred. Stirring is continued until most of the ammonia has evaporated. The resulting mixture is allowed to stand overnight exposed to room temperature conditions, i.e., about 22° C., while the remaining ammonia evaporates therefrom. A solid product is recovered weighing 21 grams.

EXAMPLE 6

To 30 cc. of a calcium amide suspension in heptane (containing 1.6 grams of calcium calculated as the metal), there was added 4.0 cc. of t-butyl alcohol (at room temperature). On the addition of said alcohol, a vigorous evolution of ammonia is observed. The resulting suspension is catalytically active.

EXAMPLE 7

To a 500 cc. Parr bomb, there is charged 5 grams of calcium metal, 9 grams of t-butanol and 100 cc. of liquid ammonia. The temperature of the ensuing reaction varies from −22° C. to +15° C. When no further pressure rises is noted, the bomb is vented to remove the gases produced in the reaction. The resulting solid product is then slurried in 100 cc. of heptane.

EXAMPLE 8

To a 3-liter resin flask while avoiding exposure to the atmosphere, there is charged 1500 cc. of liquid ammonia and 40 grams of calcium metal. To the resulting solution there is then added 22 grams of acetaldehyde over a 20 minute period. The resin flask was allowed to stand overnight exposed to room temperature conditions while the ammonia evaporated therefrom. The resulting solid product was then slurried in heptane.

EXAMPLE 9

To a 500 milliliter bomb, there is charged 5 grams of calcium metal and 50 grams of ammonia. Paraformaldehyde (4.5 grams) is heated to produce gaseous formaldehyde. The resulting gaseous formaldehyde is then introduced into the bomb which is maintained in a Dry Ice-acetone bath. After this, the bomb is allowed to warm up to about 4° to 5° C. and is maintained at this temperature for 17 hours. Thereafter, the excess ammonia is allowed to evaporate off; the resulting solid product is then slurried in 100 grams of heptane at room temperature.

EXAMPLE 10

To a three-necked three-liter flask equipped with stirrer, thermometer well, and inlet conduit, there is charged, at room temperature, 166 milliliters of 3 molar ethyl magnesium chloride in diethyl ether, 500 milliliters of anhydrous diethyl ether, and 60 milliliters of dioxane. Magnesium chloride which precipitates from the resulting stirred solution is removed via filtration. To the filtrate there are slowly added 6.2 grams of ethylene oxide, followed by bubbling ammonia through the solution over a period of about 5 hours. During this introduction of ammonia gas the solution is maintained at a temperature of about 10° to 15° C. After the excess ammonia has weathered off, the diethyl ether is removed via centrifugation and the resulting solid product, i.e., catalytically active material containing magnesium amide-butylate, is slurried in heptane. This slurry contains 0.017 gram of magnesium (calculated as the metal) per one milliliter of slurry.

When the above procedure is repeated using ethanol or butanol in lieu of ethylene oxide, the resulting slurry is catalytically active.

EXAMPLE 11

(A) To a reaction vessel maintained under a nitrogen atmosphere and which contains epsilon-caprolactone, there is charged a quantity of the catalyst slurry prepared as set forth in Example 1 supra in an amount so as to give an admixture containing 0.5 weight percent calcium (calculated as the metal), based on the weight of said epsilon-caprolactone. The reaction vessel then is placed in a constant temperature bath maintained at 90° C. for a period of 10 minutes. Thereafter, the reaction product is dissolved in acetone and reprecipitated in water. There is obtained a tough, white, crystalline solid homopolymer.

(B) In an analogous manner as above, when beta,gamma-dimethoxy-delta-valerolactone is substituted for epsilon-caprolactone and contacted with 1.0 weight percent calcium amide, there is obtained a liquid polymer.

EXAMPLE 12

(A) To a reaction vessel maintained under a nitrogen atmosphere and which contains epsilon-caprolactone, there is charged a quantity of the catalyst slurry prepared as set forth in the first paragraph of Example 2 supra in an amount so as to give an admixture containing 0.2 weight percent calcium (calculated as the metal), based on the weight of said epsilon-caprolactone. The reaction vessel then is placed in a constant temperature bath maintained at 20° C. for a period of 3 hours. There is obtained a soft, solid homopolymer.

(B) In an analogous manner as above, when magnesium amide is employed as the catalyst in an amount so as to give an admixture which contains 1.0 weight percent magnesium amide, based on the weight of epsilon-caprolactone, essentially the same results are obtained.

EXAMPLE 13

(A) To a reaction vessel maintained under a nitrogen atmosphere and which contains epsilon-caprolactone, there is charged a quantity of the catalyst suspension prepared as set forth in Example 3 supra in an amount so as to give an admixture containing 0.1 weight percent calcium (calculated as the metal), based on the weight of said epsilon-caprolactone. The reaction vessel then is placed in a constant temperature bath maintained at 90° C. for a period of 10 minutes. Thereafter, the polymeric product is recovered. There is obtained a tough solid.

(B) In an analogous manner as above, when gamma(1- isopropyl-4-methylcyclohexyl)-epsilon-caprolactone is substituted for epsilon-caprolactone and contacted with 1.0 weight percent strontium amide, there is obtained a viscous liquid product.

EXAMPLE 14

(A) To a reaction vessel maintained under a nitrogen atmosphere and which contains epsilon-caprolactone, there is charged a quantity of the catalyst slurry prepared as set forth in Example 4 supra in an amount so as to give an admixture containing 0.3 weight percent calcium (calculated as the metal), based on the weight of said epsilon-caprolactone. The reaction vessel then is placed in a constant temperature bath maintained at 90° C. for a period of 20 minutes. Thereafter, the polymeric product is recovered from the reaction vessel. There is obtained a tough, white homopolymer.

(B) In an analogous manner as above, when gamma-methyl-delta-isopropyl-epsilon-caprolactone, is substituted for epsilon-caprolactone and contacted with 1.0 weight percent barium amide, there is obtained a very viscous liquid homopolymer.

EXAMPLE 15

(A) To a reaction vessel maintained under a nitrogen atmosphere and which contains an isomeric mixture of methyl-epsilon-caprolactone, there is charged a quantity of the solid catalyst prepared as set forth in Example 5 supra in an amount so as to give an admixture containing 0.3 weight percent of said solid catalyst, based on the total weight of methyl-epsilon-caprolactone. The isomeric mixture contains, by weight, approximately 30 percent gamma-methyl-epsilon-caprolactone, and about 30 percent epsilon-methyl-epsilon-caprolactone, and about 40 percent beta-methyl- and delta-methyl-epsilon-caprolactone. This isomeric lactone mixture is prepared by reacting a mixture of 2-methyl-, 3-methyl-, and 4-methylcyclohexanone with peracetic acid. The reaction vessel then is placed in a constant temperature bath maintained at 90° C. for a period of 1 hour. Thereafter, the polymeric product is recovered. There is obtained a very viscous liquid product.

EXAMPLE 16

(A) To a reaction vessel maintained under a nitrogen atmosphere and which contains an isomeric mixture composed of a major proportion by weight of gamma-octyl-epsilon-caprolactone and a minor proportion by weight of epsilon-octyl-epsilon-caprolactone, there is charged a quantity of the catalyst suspension prepared as set forth in Example 6 supra in an amount so as to give an admixture containing 0.2 weight percent calcium (calculated as the metal), based on the total weight of octyl-epsilon-caprolactone. The reaction vessel then is placed in a constant temperature bath maintained at 90° C. for a period of 30 minutes. There is obtained a very viscous liquid product.

(B) In an analogous manner as above, when 2,3,4,5-tetrahydrobenzoxepin-2-one is substituted for the isomeric mixture of octyl-epsilon-caprolactones and contacted with 1.0 weight percent zinc amide, there is obtained a soft, solid polymer.

EXAMPLE 17

(A) To a reaction vessel maintained under a nitrogen atmosphere and which contains delta-valerolactone, there is charged a quantity of the catalyst slurry prepared as set forth in Example 7 supra in an amount so as to give an admixture containing 0.5 weight percent calcium (calculated as the metal), based on the weight of said delta-valerolactone. The reaction vessel then is placed in a constant temperature bath maintained at 90° C. for a period of two hours. Thereafter, the polymeric product is recovered. There is obtained a solid homopolymer.

(B) In an analogous manner as above, when 3-ethyl-2-keto-1,4-dioxane is substituted for delta-valerolactone and contacted with 1.0 weight percent strontium amide, a very viscous liquid is obtained.

EXAMPLE 18

(A) To a reaction vessel maintained under a nitrogen atmosphere and which contains meta-methyl-delta-valerolactone (redistilled, boiling point 137° C. at 1.5 mm. of Hg; $n_D^{31}$ of 1.4480) there is charged a quantity of the catalyst slurry prepared as set forth in Example 8 supra in an amount so as to give an admixture containing 0.2 weight percent calcium (calculated as the metal), based on the weight of said beta-methyl-delta-valerolactone. The reaction vessel then is placed in a constant temperature bath which is maintained at 110° C. for a period of about 40 minutes. Thereafter, the polymeric product is recovered. There is obtained a solid product.

(B) In an analogous manner as above, when 3-oxa-6-hydroxyhexanoic acid lactone is substituted for beta-methyl-delta-valerolactone and contacted with 0.8 weight percent barium amide, essentially similar results are obtained.

EXAMPLES 19–21

In Examples 19 through 21, various copolymers are prepared by polymerizing an admixture of two lactones in the presence of calcium amide. The procedure employed is similar to that set forth immediately preceding the operative examples. The pertinent data and results are recorded in Table I below.

*Table I*

| Example Number | Lactone Charge [1] | Catalyst Concentration [2] | Temp., °C. | Time, Min. | Description of Copolymer |
|---|---|---|---|---|---|
| 19 | 70 epsilon-caprolactone/30 beta-methyl-delta-valerolactone. | 0.8 | 100 | 12 | Tough solid. |
| 20 | 80 epsilon-caprolactone/20 beta-methyl-delta-valerolactone. | 0.8 | 100 | 12 | Do. |
| 21 | 85 epsilon-caprolactone/15 beta-methyl-delta-valerolactone. | 0.8 | 100 | 20 | Waxy solid. |

[1] Parts by weight.
[2] Weight percent catalyst, based on total weight of lactone charge.
NOTE.—Beta-methyl-delta-valerolactone redistilled; B.P. 137° C. at 1.5 mm. of Hg; $n_D^{31}$ of 1.4480.

EXAMPLE 22

(A) To a reaction vessel maintained under a nitrogen atmosphere and which contains zeta-enantholactone, there is charged a quantity of the catalyst slurry prepared as set forth in Example 9 supra in an amount so as to give an admixture containing 0.25 weight percent calcium (calculated as the metal), based on the weight of said zeta-enantholactone. The reaction vessel then is placed in a constant temperature bath maintained at 90° C. for a period of 40 minutes. Thereafter, the polymeric product is recovered. There is obtained a white, solid homopolymer.

(B) In an analogous manner as above, when 10-hydroxy-undecanoic acid lactone is substituted for zeta-

17 enantholactone and contacted with 1.0 weight percent strontium amide, essentially similar results are obtained.

EXAMPLES 23-24

In Examples 23 and 24 the procedure employed is similar to that set forth immediately preceding the operative examples. The pertinent data and results are recorded in Table II below.

*Table II*

| Example Number | Lactone Charge [1] | Catalyst | Catalyst Concentration [2] | Temp., °C. | Time, Min. | Description of Polyester |
|---|---|---|---|---|---|---|
| 23 | 30 zeta-enantholactone/70 epsilon-caprolactone. | Ca(NH$_2$)$_2$ | 1.0 | 110 | 10 | Hard solid. |
| 24 | 20 zeta-enantholactone/80 epsilon-caprolactone. | Ca(NH$_2$)$_2$ | 1.0 | 110 | 8 | Tough solid. |

[1] Admixture of two lactones is expressed as parts by weight.
[2] Weight percent catalyst, based on total weight of lactone charge.
NOTE.—Zeta-enantholactone redistilled; B.P. 72° C. at 4 mm. of Hg; $n_D^{31}$ of 1.4689.

EXAMPLE 25

(A) To a reaction vessel maintained under a nitrogen atmosphere and which contains 2-keto-1,4-dioxane, there is charged a quantity of the catalyst slurry prepared as set forth in the first paragraph of Example 10 supra in an amount so as to give an admixture containing 0.2 weight percent calcium (calculated as the metal), based on the weight of said 2-keto-1,4-dioxane. The reaction vessel then is placed in a constant temperature bath maintained at 90° C. for a period of about 1.5 hours. Thereafter, the polymeric product is recovered. There is obtained a solid polymer.

(B) In an analogous manner as above, when gamma-(1-isopropyl-4-methylcyclohexyl)-epsilon-caprolactone is substituted for 2-keto-1,4-dioxane and contacted with 1.0 weight percent zinc amide, there is obtained a viscous liquid product.

EXAMPLES 26-27

In Examples 26 and 27, various copolymers are prepared by contacting, at 90° C., a mixture of epsilon-caprolactone and delta-valerolactone with 0.8 weight percent of magnesium amide, based on the total weight of the lactone feed. The procedure employed is similar to that set forth immediately preceding the operative examples. The pertinent data and results are recorded in Table III below.

*Table III*

| Example Number | Ratio of Epsilon-Caprolactone to Delta-Valerolactone [1] | Time, Min. | Description of Copolymer |
|---|---|---|---|
| 26 | 20:80 | 12 | Hard solid. |
| 27 | 80:20 | 6 | Tough solid. |

[1] ratio is in parts by weight.

EXAMPLE 28

To a 500 cc. Parr bomb there is charged 5 grams of calcium metal, 11.5 grams of cyclohexene oxide, and 84 grams of liquid ammonia. After one hour at 0° C., a steady pressure of 50 p.s.i.g. is observed. The hydrogen and ammonia are vented off and the resulting product is suspended in 200 cc. of heptane.

(A) To a reaction vessel maintained under a nitrogen atmosphere and which contains a mixture of 80 parts by weight of epsilon-caprolactone and 20 parts by weight of mixed dimethyl-epsilon-caprolactones, there is charged a quantity of the catalyst suspension prepared above in an amount so as to give an admixture containing 0.4 weight percent calcium (calculated as the metal), based on the total weight of the lactone feed. The mixed dimethyl-epsilon-caprolactones is an isomeric mixture of beta-gamma-dimethyl- and gamma,delta-dimethyl-epsi-

18 lon-caprolactones. The reaction vessel then is placed in a constant temperature bath maintained at 180° C. for a period of 1.5 hours. There is obtained a soft solid product.

(B) In an analogous manner as above, when equal parts by weight of 12-oxa-15-hydroxypentadecanoic acid lactone and 7-hydroxyheptanoic acid lactone are employed as the monomeric feed and contacted with 1.0 weight percent strontium amide, substantially similar results are obtained.

EXAMPLE 29

To a 500 cc. Parr bomb there is charged 5 grams of calcium metal, 9 grams of styrene oxide, and 96 grams of anhydrous ammonia. After one hour at 0° C., a steady pressure of 50 p.s.i.g. has developed. The hydrogen and ammonia are vented off and the resulting product is slurried in 200 cc. of heptane.

(A) To a reaction vessel maintained under a nitrogen atmosphere and which contains a mixture of 50 parts by weight of epsilon-caprolactone and 50 parts by weight of mixed octyl-epsilon-caprolactones, there is charged a quantity of the above prepared catalyst slurry in an amount so as to give an admixture containing 0.4 weight percent calcium (calculated as the metal), based on the total weight of the lactone feed. The mixed octyl-caprolactones comprises a major proportion by weight of gamma-octyl- and a minor proportion by weight of epsilon-octyl-epsilon-caprolactones. The reaction vessel then is placed in a constant temperature bath maintained at 20° C. for a period of one hour. Thereafter, the reaction product is dissolved in acetone and reprecipitated in water. There is obtained a waxy copolymer.

(B) In an analogous manner as above, when equal parts by weight of 9-oxabicyclo[5.2.2]undecan-8-one and 1,4-dioxane-2-one are employed as the monomeric feed and contacted with 1.0 weight percent magnesium amide, essentially similar results are obtained.

EXAMPLE 30

(A) To a reaction vessel maintained under a nitrogen atmosphere and which contains ortho-(2-hydroxyethyl)-phenylacetic acid lactone, there is charged magnesium amide in an amount so as to give an admixture containing 1.0 weight percent magnesium amide, based on the weight of said ortho-(2-hydroxyethyl)-phenylacetic acid lactone. The reaction vessel then is placed in a constant temperature bath maintained at 90° C. for a period of one hour. There is obtained a solid polymer.

(B) In an analogous manner as above, when cis-3-oxabicyclo[5.4.0]undecan-4-one is substituted for ortho-(2-hydroxyethyl)-phenylacetic acid lactone and contacted with 1.0 weight percent calcium amide, essentially similar results are obtained.

Although the invention has been illustrated by the preceding examples, the invention is not to be construed as limited to the materials employed in the above exemplary examples, but rather, the invention encompasses the generic area as hereinbefore disclosed. Various modifications and embodiments of this invention can be made without departing from the spirit and scope thereof.

What is claimed is:

1. A process which comprises contacting as the sole polymerizable reagent at least one cyclic ester characterized by the following formula:

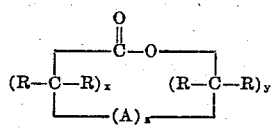

wherein each R, individually, is selected from the group consisting of hydrogen, alkyl, aryl, alkaryl, aralkyl, cycloalkyl, halo, haloalkyl, alkoxyalkyl, alkoxy, aryloxy, a portion of an aromatic hydrocarbon nucleus which nucleus is fused to the cyclic ester ring, and a portion of a saturated cycloaliphatic hydrocarbon nucleus which nucleus contains from 4 to 10 carbon atoms and which is fused to the cyclic ester ring; wherein A is selected from the group consisting of an oxy group, a thio group, and a divalent saturated aliphatic hydrocarbon group; wherein $x$ is an integer in the range of from 1 to 15 inclusive; wherein $y$ is an integer in the range of from 1 to 15 inclusive; and wherein $z$ is an integer selected from the group consisting of zero and one; with the provisos that (a) the sum of $x+y+z$ cannot equal three, (b) the total number of atoms forming the cyclic ester ring does not exceed 18, and (c) the total number of organic substituents attached to the carbon atoms contained in the cyclic ester ring does not exceed four; with from about 0.001 to about 10 weight percent, based on the total weight of cyclic ester, of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; under substantially anhydrous conditions; for a period of time sufficient to produce a polymer.

2. A process which comprises contacting as the sole polymerizable reagents at least two cyclic esters which are characterized by the following formula:

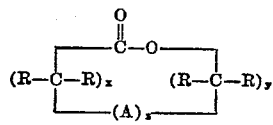

wherein each R, individually, is selected from the group consisting of hydrogen, alkyl, aryl, alkaryl, aralkyl, cycloalkyl, halo, haloalkyl, alkoxyalkyl, alkoxy, aryloxy, a portion of an aromatic hydrocarbon nucleus which nucleus is fused to the cyclic ester ring, and a portion of a saturated cycloaliphatic hydrocarbon nucleus which nucleus contains from 4 to 10 carbon atoms and which is fused to the cyclic ester ring; wherein A is selected from the group consisting of an oxy group, a thio group, and a divalent saturated aliphatic hydrocarbon group; wherein $x$ is an integer in the range of from 1 to 15 inclusive; wherein $y$ is an integer in the range of from 1 to 15 inclusive; and wherein $z$ is an integer selected from the group consisting of zero and one; with the provisos that (a) the sum of $x+y+z$ cannot equal three, (b) the total number of atoms forming the cyclic ester ring does not exceed 18, and (c) the total number of organic substituents attached to the carbon atoms contained in the cyclic ester ring does not exceed four; with from about 0.001 to about 10 weight percent, based on the total weight of cyclic ester, of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; under substantially anhydrous conditions; for a period of time sufficient to produce a polymer.

3. A process which comprises contacting delta-valerolactone, as the sole polymerizable reagent, with from about 0.01 to about 3.0 weight percent, based on the weight of said delta-valerolactone, of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; at a temperature in the range of from about $-20°$ C. to about $225°$ C.; under substantially anhydrous conditions; and for a period of time sufficient to produce a polymer.

4. The process of claim 3 wherein said compound is calcium amide.

5. The process of claim 3 wherein said compound is calcium amide-lower alkylate.

6. A process which comprises contacting an alkyl-substituted delta-valerolactone, as the sole polymerizable reagent, with from about 0.01 to about 3.0 weight percent, based on the weight of said alkyl-substituted delta-valerolactone of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; at a temperature in the range of from about $-20°$ C. to about $225°$ C.; under substantially anhydrous conditions; and for a period of time sufficient to produce a polymer.

7. The process of claim 6 wherein said compound is calcium amide.

8. The process of claim 6 wherein said compound is calcium amide-lower alkylate.

9. A process which comprises contacting epsilon-caprolactone, as the sole polymerizable reagent, with from about 0.01 to about 3.0 weight percent, based on the weight of said epsilon-caprolactone; of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; at a temperature in the range of from about $-20°$ C. to about $225°$ C.; under substantially anhydrous conditions; and for a period of time sufficient to produce a polymer.

10. The process of claim 9 wherein said compound is calcium amide.

11. The process of claim 9 wherein said compound is calcium amide-lower alkylate.

12. A process which comprises contacting an alkyl-substituted epsilon-caprolactone, as the sole polymerizable reagent, with from about 0.01 to about 3.0 weight percent, based on the weight of said alkyl-substituted epsilon-caprolactone; of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; at a temperature in the range of from about $-20°$ C. to about $225°$ C.; under substantially anhydrous conditions; and for a period of time sufficient to produce a polymer.

13. The process of claim 12 wherein said compound is calcium amide.

14. The process of claim 12 wherein said compound is calcium amide-lower alkylate.

15. A process which comprises contacting, as the sole polymerizable reagents, a monomeric lactone admixture of delta-valerolactone and alkyl-substituted delta-valerolactones, with from 0.01 to about 3.0 weight percent, based on the total weight of the monomeric lactone feed; of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; at a temperature in the range of from about −20° C. to about 225° C.; under substantially anhydrous conditions; and for a period of time sufficient to produce a polymer.

16. A process which comprises contacting, as the sole polymerizable reagents, a monomeric lactone admixture of delta-valerolactone and epsilon-caprolactone with from about 0.01 to about 3.0 weight percent, based on the total weight of the monomeric lactone feed; of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; at a temperature in the range of from about −20° C. to about 225° C.; under substantially anhydrous conditions; and for a period of time sufficient to produce a polymer.

17. A process which comprises contacting, as the sole polymerizable reagents, a monomeric lactone admixture of delta-valerolactone and alkyl-substituted epsilon-caprolactones, with from about 0.01 to about 3.0 weight percent, based on the total weight of the monomeric lactone feed; of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; at a temperature in the range of from about −20° C. to about 225° C.; under substantially anhydrous conditions; and for a period of time sufficient to produce a polymer.

18. A process which comprises contacting, as the sole polymerizable reagents, a monomeric lactone admixture of epsilon-caprolactone and alkyl-substituted delta-valerolactones, with from about 0.01 to about 3.0 weight percent, based on the total weight of the monomeric lactone feed; of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; at a temperature in the range of from about −20° C. to about 225° C.; under substantially anhydrous conditions; and for a period of time sufficient to produce a polymer.

19. A process which comprises contacting, as the sole polymerizable reagents, a monomeric lactone admixture of epsilon-caprolactone and alkyl-substituted epsilon-caprolactones, with from about 0.01 to about 3.0 weight percent, based on the total weight of the monomeric lactone feed; of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; at a temperature in the range of from about −20° C. to about 225° C.; under substantially anhydrous conditions; and for a period of time sufficient to produce a polymer.

20. A process which comprises contacting, as the sole polymerizable reagents, a monomeric lactone admixture of alkyl-substituted epsilon-caprolactones and alkyl-substituted delta-valerolactones, with from about 0.01 to about 3.0 weight percent, based on the total weight of the monomeric lactone feed; of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; at a temperature in the range of from about −20° C. to about 225° C.; under substantially anhydrous conditions; and for a period of time sufficient to produce a polymer.

21. A process which comprises contacting, as the sole polymerizable reagents, a monomeric lactone admixture of alkyl-substituted delta-valerolactones, with from about 0.01 to about 3.0 weight percent, based on the total weight of the monomeric lactone feed; of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; at a temperature in the range of from about −20° C. to about 225° C.; under substantially anhydrous conditions; and for a period of time sufficient to produce a polymer.

22. A process which comprises contacting, as the sole polymerizable reagents, a monomeric lactone admixture of alkyl-substituted epsilon-caprolactones, with from about 0.01 to about 3.0 weight percent, based on the total weight of the monomer lactone feed; of a compound selected from the group consisting of (a) $H_2N—M—NH_2$, (b) $H_2N—M—OR_1$ wherein $R_1$ is a monovalent hydrocarbon radical, and (c) mixtures of (a) and (b), the variable M being selected from the group consisting of magnesium, calcium, zinc, strontium, cadmium, and barium; at a temperature in the range of from about −20° to about 225° C.; under substantially anhydrous conditions; and for a period of time sufficient to produce a polymer.

References Cited in the file of this patent

UNITED STATES PATENTS

| | | |
|---|---|---|
| 2,809,958 | Barnes et al. | Oct. 15, 1957 |
| 2,878,236 | Young et al. | Mar. 17, 1959 |

UNITED STATES PATENT OFFICE
CERTIFICATE OF CORRECTION

Patent No. 3,021,311 February 13, 1962

Eugene F. Cox et al.

It is hereby certified that error appears in the above numbered patent requiring correction and that the said Letters Patent should read as corrected below.

Column 9, line 28, after "0.05" insert -- to about 1.0 weight percent is highly preferred. For --.

Signed and sealed this 24th day of July 1962.

(SEAL)
Attest:

ERNEST W. SWIDER
Attesting Officer

DAVID L. LADD
Commissioner of Patents